US008725095B2

(12) United States Patent
Li et al.

(10) Patent No.: US 8,725,095 B2
(45) Date of Patent: May 13, 2014

(54) PLANAR INVERTED-F ANTENNAS, AND MODULES AND SYSTEMS IN WHICH THEY ARE INCORPORATED

(75) Inventors: Qiang Li, Gilbert, AZ (US); Jon T. Adams, Scottsdale, AZ (US); Olin L. Hartin, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 44 days.

(21) Appl. No.: 13/339,139

(22) Filed: Dec. 28, 2011

(65) Prior Publication Data

US 2013/0171950 A1 Jul. 4, 2013

(51) Int. Cl.
*H04B 1/04* (2006.01)

(52) U.S. Cl.
USPC ..................... 455/129; 455/562.1; 455/575.5; 455/575.7

(58) Field of Classification Search
USPC ........................ 455/129, 562.1, 575.5, 575.7; 342/700 MS, 846
See application file for complete search history.

(56) References Cited

U.S. PATENT DOCUMENTS 5,550,554 A * 8/1996 Erkocevic ..................... 343/828
6,072,434 A * 6/2000 Papatheodorou ...... 343/700 MS
6,268,831 B1 * 7/2001 Sanford ........................ 343/702
7,450,072 B2 * 11/2008 Kim et al. ............. 343/700 MS
7,733,286 B2 6/2010 Chen et al.
7,768,471 B2 8/2010 Su et al.
7,796,086 B2 9/2010 Coskun et al.
2009/0256758 A1 * 10/2009 Schlub et al. ................ 343/702
2011/0201288 A1 8/2011 Hooper et al.

OTHER PUBLICATIONS

Ali, et al., "Analysis of Integrated Inverted-F Antennas for Bluetooth Applications," Antennas and Propagation for Wireless Communications, p. 21-24; Nov. 2000.
Pinel, S., et al., "RF System-on-Package (SOP) Development for compact low cost Wireless Front-end systems," Microwave Conference, 32nd European; Sep. 2002.
Abedin, M.F., et al, "Modifying the Ground Plane and Its Effect on Planar Inverted-F Antennas (PIFAs) for Mobile Phone Handsets," IEEE Antennas and Wireless Propagation Letters, vol. 2, p. 226-229; 2003.
Chan, P.W., et al., "Dual-Band Printed Inverted-F Antenna for DCS, 2.4GHZ WLAN Applications," 2008 Loughborough Antennas & Propagation Conference, p. 185-188; Mar. 17-18, 2008.
Ling, C., et al. "Analysis and Application of an On-Package Planar Inverted-F Antenna," IEEE Transactions on Antennas and Propagation, vol. 55, No. 6, p. 1774-1780; Jun. 2007.
Lee, K., et al., "Bandwidth Enhanced Planar Inverted-F Antenna with Modified Ground Structure," Proceedings of Asia-Pacific Microwave Conference 2007; Dec. 2007.

* cited by examiner

*Primary Examiner* — Sanh Phu
(74) *Attorney, Agent, or Firm* — Sherry W. Schumm

(57) ABSTRACT

An embodiment of an antenna includes a radiation frame and a planar inverted-F antenna (PIFA). The radiation frame has a frame shape that defines a central opening. The PIFA includes an antenna arm, a feed arm, and a shorting arm. A distal end of the shorting arm is conductively coupled with the radiation frame. The antenna may be coupled to a substrate of an RF module. The RF module may be included in a system that also includes a non-RF component that produces a signal for transmission. In such a system, the RF module is configured to receive the signal, convert the signal to an RF signal, and radiate the RF signal over an air interface.

17 Claims, 4 Drawing Sheets

- PRIOR ART -

PLANAR INVERTED-F ANTENNAS, AND MODULES AND SYSTEMS IN WHICH THEY ARE INCORPORATED

TECHNICAL FIELD

Embodiments relate to antennas, and more particularly to planar inverted-F antennas, and modules and systems within which they are incorporated.

BACKGROUND

Planar inverted-F antennas (PIFAs) are commonly used in portable electronic systems (e.g., cellular telephones) due to their relatively small size, when compared with other antenna options. For example FIG. 1 illustrates a top view of a conventional PIFA 100, which is printed on a substrate 102 (e.g., a printed circuit board or PCB). PIFA 100 is formed in the top metal layer, as illustrated, and includes a conductive radiating element (or "antenna arm") 104, a conductive shorting arm 106, and a conductive feed arm 108. A solid, conductive ground plane 120 is formed in a lower metal layer, as indicated by the dashed border of conductive ground plane 120. One or more conductive vias or plates (not illustrated) electrically interconnect a distal end 110 of the shorting arm 106 through the substrate 102 to the ground plane 120.

In order to use PIFA 100 to radiate or receive radio frequency (RF) signals, the PIFA 100 is interconnected with a signal source and/or load (e.g., a transceiver, not illustrated). More particularly, an input (or distal) end 112 of the feed arm 108 is electrically connected with a signal input transmission line (e.g., a 50-Ohm microstrip transmission line, not illustrated), which in turn is connected with the signal source/load. Generally, the impedance of the PIFA 100 and the impedance of the signal source/load are not matched. Accordingly, the input end 112 of the feed arm 108 may be tapered to compensate for the abrupt step transition between the input transmission line and the PIFA 100.

In conventional PIFAs, a solid ground plane (or a solid ground plane with small, narrow slots) having a certain size (e.g., typically $>\lambda/4$) is required to achieve antenna performance. Because the ground plane 120 consumes a substantial portion of the area of the layer in which it is included, conductive routing (e.g., the signal input transmission line and other routing) typically is printed on a different metal layer (e.g., the top metal layer or some other layer, not illustrated). Accordingly, conventional PIFAs typically include three or more metal layers. Alternatively, in a design that includes only two metal layers, routing is restricted to the top metal layer.

DETAILED DESCRIPTION

Embodiments include planar inverted-F antennas (PIFAs) with unique radiation structures that replace conventional, solid ground plane structures, and systems and modules within which such inverted-F antennas are incorporated. More particularly, an embodiment includes a PIFA with a frame-shaped radiation structure (i.e., a closed radiation structure having a central opening or such a structure with a gap), as opposed to a solid ground structure used in conventional PIFAs. When included in an RF module, conductive structures (e.g., routing) and/or electrical components (e.g., transceivers and other RF components) may be included in the central opening of the frame-shaped radiation structure. This allows for more compact RF modules (with PIFAs and ground structures) than those that include conventional PIFAs and solid ground structures.

Figure 1:
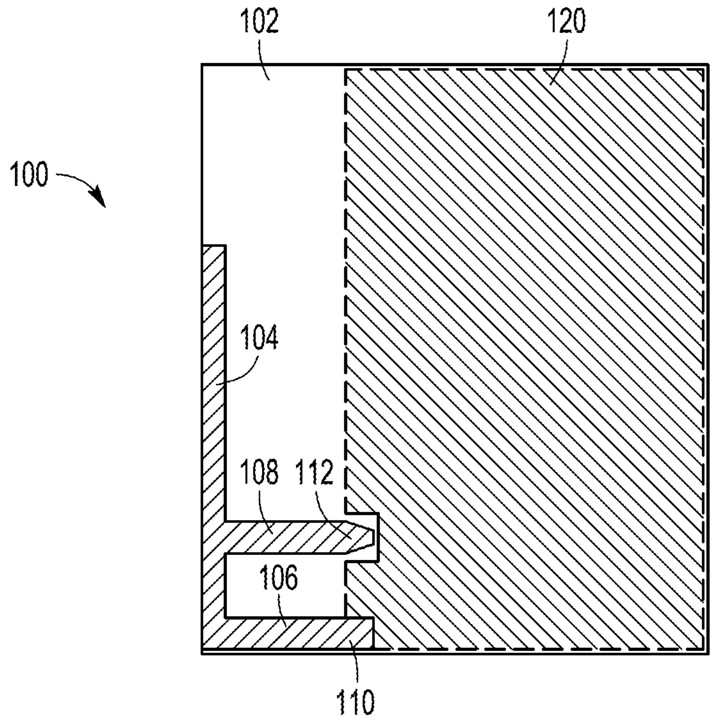
FIG. 1 illustrates a planar inverted-F antenna and a ground plane, in accordance with the prior art.
Figure 2:
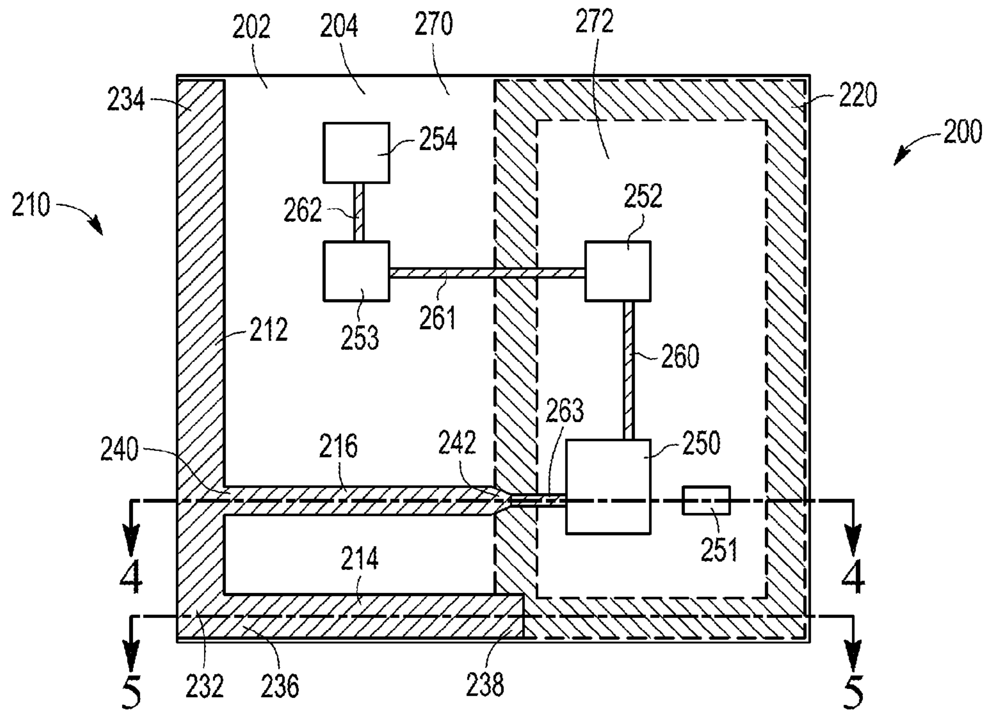
FIGS. 2 and 3 illustrate top and bottom views, respectively, of a radio frequency (RF) module that includes a dielectric substrate, a planar inverted-F antenna (PIFA), and a frame-shaped radiation structure, according to an example embodiment.
Figure 3:
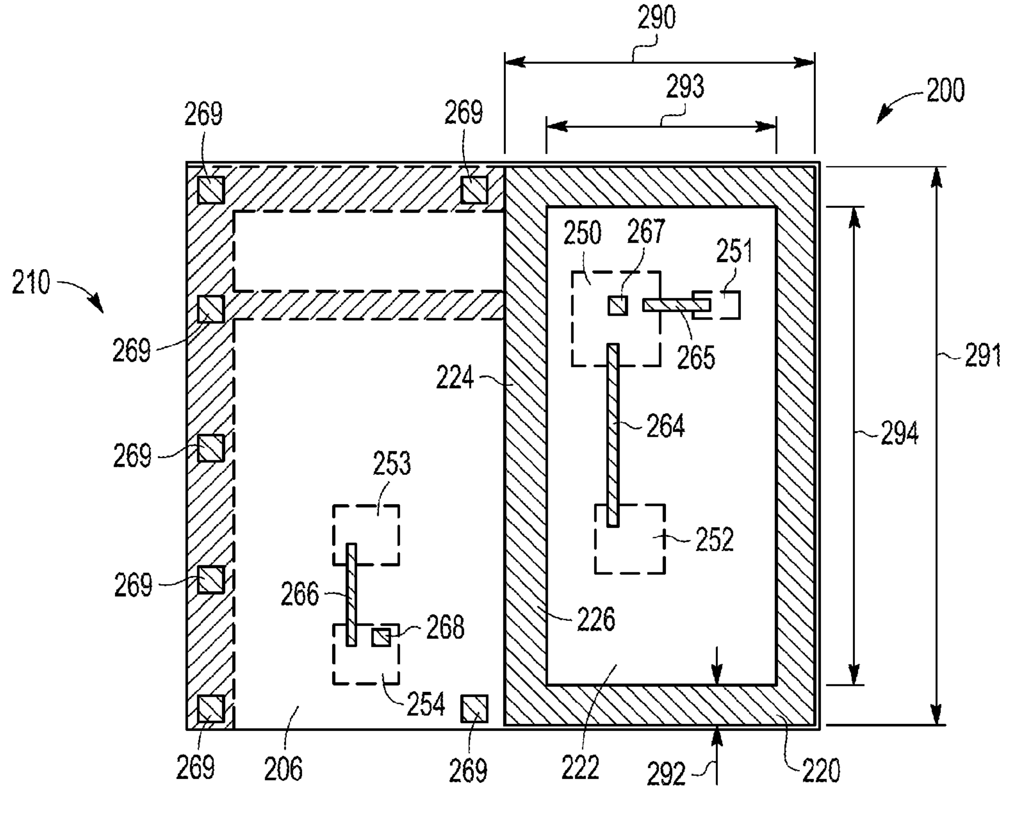

FIGS. 2 and 3 illustrate top and bottom views, respectively, of a radio frequency (RF) module 200 that includes a dielectric substrate 202 and an antenna. The antenna includes a planar inverted-F antenna (PIFA) 210 and a radiation frame 220, according to an example embodiment. Generally, FIG. 2 depicts PIFA 210 and other elements of module 200 that are located on the top surface 204 of the substrate 202, and FIG. 3 depicts radiation frame 220 and other elements of module 200 that are located on the bottom surface 206 of the substrate 202. To more clearly illustrate and describe the various embodiments, however, radiation frame 220 also is depicted in FIG. 2 (with a dashed border to indicate that it is not positioned on the top surface 204), even though radiation frame 220 is not located on the top surface, in the illustrated embodiment. Similarly, PIFA 210 and various top-side electrical components 250-254 also are depicted in FIG. 3 (with dashed borders to indicate that they are not positioned on the top surface 204), even though PIFA 210 and electrical components 250-254 are not located on the bottom surface, in the illustrated embodiment.

Substrate 202 has a top surface 204, an opposed, bottom surface 206, and at least one dielectric layer between the top and bottom surfaces 204, 206. For example, substrate 202 may be a printed circuit board (PCB) or other dielectric substrate. In the embodiments described in detail below, substrate 202 consists of a single dielectric layer. In alternate embodiments, substrate 202 may include two or more dielectric layers and a metal layer between each of the dielectric layers. Substrate 202 has a thickness in a range of about 0.05 millimeters (mm) to about 5 mm, with a thickness in a range of about 0.1 mm to about 0.2 mm being preferred. According to a specific embodiment, substrate 202 has a thickness of about 0.1 mm. In addition, substrate 202 has a length (horizontal dimension in FIG. 2) and a width (vertical dimension in FIG. 2) each in a range of about 15 mm to about 30 mm, with a length and a width in a range of about 20 mm to about 25 mm being preferred. According to a specific embodiment, substrate 202 has a length of about 25 mm and a width of about 20 mm. In other embodiments, substrate 202 may be thicker or thinner than the above-given ranges, and/or may have a length and/or width that are larger or smaller than the above-given ranges.

Figure 4:
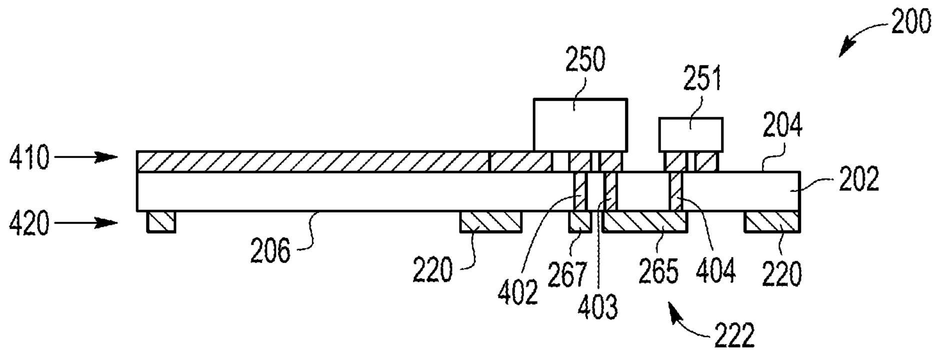
FIGS. 4 and 5 are cross-sectional views of the RF module of FIG. 2 taken along lines 4-4 and 5-5, respectively.
Figure 5:
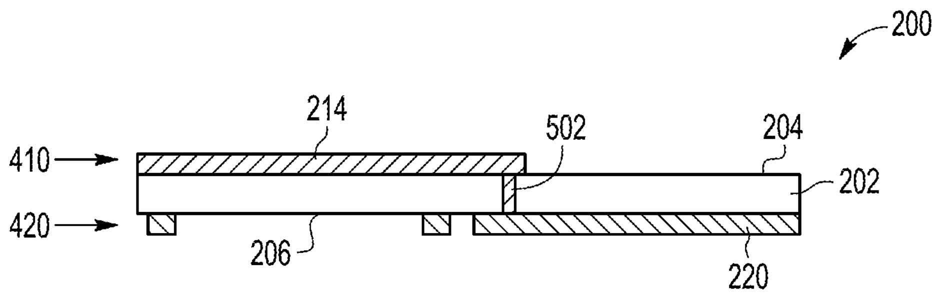

PIFA 210 forms a portion of a PIFA metal layer (e.g., layer 410, FIGS. 4, 5), and radiation frame 220 forms a portion of a radiation frame metal layer (e.g., layer 420, FIGS. 4, 5). In the illustrated embodiment, the PIFA metal layer is a patterned conductive layer on the top surface 204 of substrate 202, and the radiation frame metal layer is a patterned conductive layer on a bottom surface 206 of the dielectric substrate 202. The PIFA metal layer may be considered to be a first metal layer (M1) of the module 200, and the radiation frame metal layer may be considered to be a second metal layer (M2) of the module 200, where the M1 and M2 layers are separated by the dielectric material comprising substrate 202, in an embodiment. The PIFA 210 and the radiation frame 220 are offset from each other, in that the PIFA 210 and the radiation frame 220 are on different portions of substrate 202 (i.e., PIFA 210 does not overlie the radiation frame 220). In other embodiments, particularly embodiments in which a relatively thick substrate 202 is used, the PIFA 210 may overlie the radiation frame 220.

PIFA 210 includes an antenna arm 212, a shorting arm 214, and a feed arm 216. The antenna arm 212 has a proximal end 232 and a distal end 234. Similarly, the shorting arm 214 has a proximal end 236 and a distal end 238, and the feed arm 216 has a proximal end 240 and a distal end 242. The proximal end 236 of the shorting arm 214 is coupled with the proximal end 232 of the antenna arm 212 to define an open end at the distal end 234 of the antenna arm 212. The distal end 238 of the shorting arm 214 is coupled with the radiation frame 220 through one or more conductive structures (e.g., via 502, FIG. 5) that extend between the top and bottom surfaces 204, 206 of substrate 202 (i.e., the shorting arm 214 and the radiation frame 220 are conductively or electrically coupled). The proximal end 240 of the feed arm 216 is coupled to the antenna arm 212 between the shorting arm 214 and the distal end 234 of the antenna arm 212. The distal end 242 of the feed arm 216 is coupled to a transmission line 263 (e.g., a 50-Ohm microstrip transmission line), which carries an RF signal to be radiated onto the air interface by the PIFA 210. A taper at the distal end 242 of the feed arm 216 is configured to compensate for the abrupt step transition encountered between the transmission line 263 and the PIFA 210. The input impedance of the PIFA 210 can be designed to have an appropriate value to match the load impedance, which may or may not be 50 Ohms.

Excitation of currents in the PIFA 200 causes excitation of currents in the radiation frame 220. The resulting electromagnetic field is formed by the interaction of the PIFA 200 and an image of itself below the radiation frame 220. Essentially, the combination of the PIFA 200 and the radiation frame 220 operate as an asymmetric dipole. As is known by those of skill in the art, the various dimensions of the antenna arm 212, shorting arm 214, and feed arm 216, as well as the distance between the shorting arm 214 and the feed arm 216, among other things, can be adjusted to achieve a desired center of resonant frequency and bandwidth of the PIFA 200. According to an embodiment, antenna arm 212, shorting arm 214, and feed arm 216 are sized and arranged to have a center of resonant frequency within an ISM band (Industrial, Scientific, and Medical radio band). For example, according to a particular embodiment, antenna arm 212, shorting arm 214, and feed arm 216 are sized and arranged to have a center of resonant frequency within a frequency band spanning from about 2.400 gigahertz (GHz) to about 2.500 GHz, although antenna arm 212, shorting arm 214, and feed arm 216 may be sized and arranged to have a center of resonant frequency within other bands, as well.

Radiation frame 220 is a planar conductive structure defined by an outer boundary 224 and an inner boundary 226. A central opening 222 (i.e., non-conductive) is defined by the inner boundary 226. Although FIGS. 2 and 3 depict the outer and inner boundaries 224, 226 as being concentric rectangles, the outer and inner boundaries 224, 226 may have other shapes as well (e.g., polygons, circles, ovals, or other shapes). In other words, radiation frame 220 may have a rectangular frame shape, as illustrated, or radiation frame 220 may have a non-rectangular frame shape, including another geometrical shape or an irregular shape, in various embodiments. Further, the outer and inner boundaries 224, 226 may be concentric or non-concentric. Further still, corners of the radiation frame 220 may be mitered or rounded.

Radiation frame 220 has a length 290 and a height 291, which define a total area occupied by the radiation frame (including the central opening 222). A dimension or multiple dimensions (e.g., the length 290 and/or height 291 and/or some other dimension) of the radiation frame 220 is less than about one quarter of the operating wavelength (i.e., $\lambda/4$). According to an embodiment, radiation frame 220 has a length 290 in a range of about 8 mm to about 15 mm, with a length 290 in a range of about 10 mm to about 13 mm being preferred. According to a specific embodiment, radiation frame 220 has a length 290 of about 12 mm. Radiation frame has a height 291 in a range of about 15 mm to about 25 mm, with a height 291 in a range of about 18 mm to about 22 mm being preferred. According to a specific embodiment, radiation frame 220 has a height 291 of about 20 mm. In other embodiments, length 290 and/or height 291 may be larger or smaller than the above-given ranges.

Central opening 222 has a length 293 and a height 294, which define an area of the central opening 222 (referred to herein as the "central opening area." According to an embodiment, the central opening area is in a range of about 20 percent to about 90 percent of the total area occupied by the radiation frame (including the central opening 222). According to another embodiment, the central opening area is in a range of about 60 percent to about 80 percent of the total area occupied by the radiation frame (including the central opening 222). In other embodiments, the central opening area may be greater or smaller than the above-given ranges.

The distance between the outer and inner boundaries 224, 226 defines the frame width 292. Although the embodiments illustrated in FIGS. 2 and 3 depict a relatively consistent frame width 292 around the entire radiation frame 220, the frame width 292 may vary around the radiation frame 220 in other embodiments. According to an embodiment, the frame width 292 is in a range of about 5 percent to about 30 percent of the length 290 or height 291 of the radiation frame 220, with a frame width 292 in a range of about 10 percent to about 20 percent of the length 290 or height 291 being preferred. In other embodiments, the frame width may be greater or smaller than the above-given ranges.

According to an embodiment, RF module 200 also includes one or more electrical components 250, 251, 252, 253, 254 which, in conjunction with PIFA 210 and radiation frame 220 form an RF module configured to function as a transmitter, receiver, or transceiver. For example, but not by way of limitation, electrical components 250-254 may include one or more transceivers, transmitters, receivers, crystal oscillators, Baluns, or other components. In particular, for example, electrical component 250 may be a transceiver, Balun, or other component that supplies an RF signal to transmission line 263, which in turn, is coupled to the distal (input) end 242 of feed arm 216.

As shown in FIG. 3, some of the electrical components 250-252 may be coupled to a portion of the substrate 202 that coincides with the central opening 222. Although FIGS. 3 and 4 depict electrical components 250-252 being coupled to a portion 272 of the top surface 204 of the substrate 202 that overlies the central opening 222 (i.e., electrical components 250-252 are on an opposite side of the substrate 202 from the central opening 222), it is to be understood that some or all of electrical components 250-252 also or alternatively could be coupled to the bottom surface 206 of the substrate 202 within the central opening 222.

In addition to the electrical components 250-252 coupled to a portion of the substrate 202 that coincides with the central opening 222, RF module 200 also may include one or more additional electrical components 253, 254 that are coupled to a portion of the substrate 202 that does not coincide with the radiation frame 220 or the central opening 222. For example, the additional electrical components 253, 254 may be coupled to a portion 270 of the top surface 204 that does not include conductive portions of PIFA 210 and that does not overlie the radiation frame 220 or its central opening 222. Again, although FIGS. 3 and 4 depict electrical components 253, 254 being coupled to the top surface 204 of substrate 202, it is to be understood that some or all of electrical components 253, 254 also or alternatively could be coupled to the bottom surface 206 of the substrate 202 in an area that is not encompassed by radiation frame 220.

RF module 200 also may include conductive interconnects 260, 261, 262, 263, 264, 265, 266 and other conductive structures 267, 268 (e.g., input/output pads and mechanical connection pads), in an embodiment. Some of the conductive interconnects 260-263 are coupled to the top surface 204 of substrate 202, and may provide routing (e.g., signal, ground, and so on) between electrical components 250-254 on the top surface 204. For example, as discussed previously, conductive interconnect 263 may be a transmission line (e.g., a 50 Ohm microstrip transmission line), which is coupled between component 250 and the distal (input) end 242 of feed arm 216. Other ones of the conductive interconnects 260-262 may provide top-surface routing between the various electrical components 250-254. According to an embodiment, conductive interconnects 260-263 form portions of the PIFA metal layer (or M1).

According to an embodiment, other ones of the conductive interconnects 264-266 and the other conductive structures 267, 268, 269 are coupled to the bottom surface 206 of substrate 202. Conductive interconnects 264-266 also may provide routing between the electrical components 250-254 on the top surface 204, as will be explained in more detail in conjunction with FIG. 4. More specifically, conductive interconnects 264-266 may provide bottom-surface routing between the various electrical components 250-254, in addition to the top-surface routing provided by conductive interconnects 260-263. Conductive structures 267, 268 include I/O pads (or other structures), which may be electrically coupled with corresponding I/O pads (or other structures) on another substrate (e.g., substrate 802, FIG. 8). Conductive structures 269 include floating pads, in an embodiment, which may be soldered to corresponding floating pads on another substrate (e.g., substrate 802, FIG. 8) to provide mechanical connection between RF module 200 and the other substrate. In alternate embodiments, RF module 200 and the other substrate may be mechanically connected using pins, glues, or other means. According to an embodiment, conductive interconnects 264-266 and conductive structures 267-269 form portions of the radiation frame metal layer (or M2).

Conductive interconnect 266 and conductive structure 268 are coupled to a portion of the bottom surface 206 of substrate 202 that does not coincide with the radiation frame 220 or the central opening 222. According to an embodiment, the central opening 222 also provides an area on the radiation frame metal layer (or M2) for routing between electrical components 250-254 and interconnection with other substrates (e.g., substrate 802, FIG. 8). More specifically, for example, conductive interconnects 264, 265 and conductive structure 267 are located within the central opening 222 of the radiation frame 220. Conductive interconnects 264, 265 and conductive structure 267 are electrically isolated from the radiation frame 220, in an embodiment. By utilizing central opening 222 as an additional area on the bottom surface 206 of substrate 202 for routing and interconnection, RF module 200 may be more compact that other, similarly functioning modules that have solid ground planes. Accordingly, utilization of embodiments of radiation frame 220 may facilitate relatively compact RF modules. In addition, the availability of the central opening 222 on the bottom surface 206 for routing enables conductive interconnects on the top and bottom surfaces 204, 206 to cross over each other. If only one metal layer were available for routing, such cross-over would not be possible.

FIGS. 4 and 5 are cross-sectional views of RF module 200 taken along lines 4-4 and 5-5 of FIG. 2, respectively. FIGS. 4 and 5 depict various conductive structures on the top and bottom surfaces 204, 206 of substrate 202 that are interconnected with conductive vias 402, 403, 404, 502 or other conductive structures extending through the substrate 202 between the top and bottom surfaces 204, 206 (e.g., conductive structures between the PIFA metal layer 410 (M1) and the radiation frame metal layer 420 (M2)). More particularly, via 402 conductively couples a pad (not numbered) on the bottom of electrical component 250 with conductive structure 267 (e.g., a corresponding pad) within the central opening 222 of radiation frame 220, thus providing a bottom-side interconnect to electrical component 250. Similarly, vias 403 and 404 conductively couple pads (not numbered) on the bottom of electrical components 250, 251 to opposite ends of conductive interconnect 265 within central opening 222, thus providing a conductive path between electrical components 250, 251. More particularly, bottom-side conductive interconnect 265 may be considered to be routing that provides a portion of a conductive path between electrical components 250, 251. Similarly, via 502 (FIG. 5) conductively couples shorting arm 215 with radiation frame 220.

In the above description, PIFA 210 and its corresponding radiation frame 220 are included in different metal layers of a module. In alternate embodiments (not illustrated), a PIFA and its corresponding radiation frame may be in the same metal layer of a module (e.g., both a PIFA and a ground plane could be printed on the same surface of the substrate). In addition, although the various embodiments discussed herein describe an RF module 200 with two metal layers (e.g., layers 410, 420, FIG. 4) and a single dielectric layer (e.g., substrate 202, FIG. 2) positioned between them, alternate embodiments may include three or more metal layers and two or more dielectric layers separating the three or more metal layers. The PIFA and radiation frame may be in adjacent metal layers (i.e., metal layers separated by a single dielectric layer), as described above, or one or more metal layers (and two or more corresponding dielectric layers) may be intervening between the PIFA and the radiation frame, in various alternate embodiments. Further, either or both the PIFA and the radiation frame may be included as part of a metal layer that is between the surface metal layers (i.e., metal layers other than surface metal layers), in various embodiments. Although such alternate embodiments are not discussed in detail herein, those of skill in the art would understand, based on the description, how to modify the various embodiments discussed herein to produce such a system.

Further, although various electrical components 250-254, conductive interconnects 260-266, and conductive structures 267-269, 402-404, 502 are illustrated in FIGS. 2-5 in various positions, it is to be understood that the numbers and arrangements of electrical components 250-254, conductive interconnects 260-266, and conductive structures 267-269 included in FIGS. 2 and 3 were selected to facilitate explanation of the various embodiments, and the selected numbers and arrangements, along with the depicted interconnections between electrical components 250-254, are not to be construed as limiting.

Figure 6:
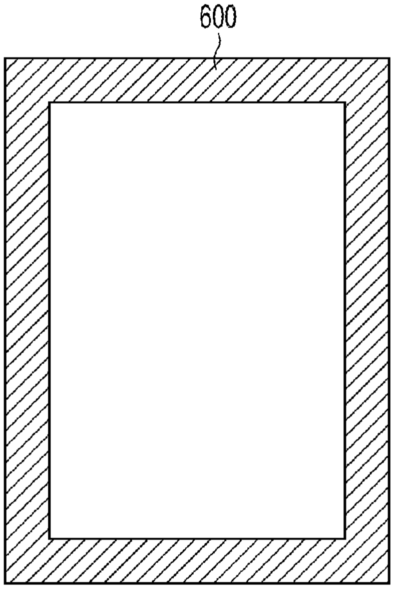
FIG. 6 illustrates a rectangular, frame-shaped radiation structure formed from conductive material that is continuous around an entirety of the radiation structure, according to an example embodiment.
Figure 7:
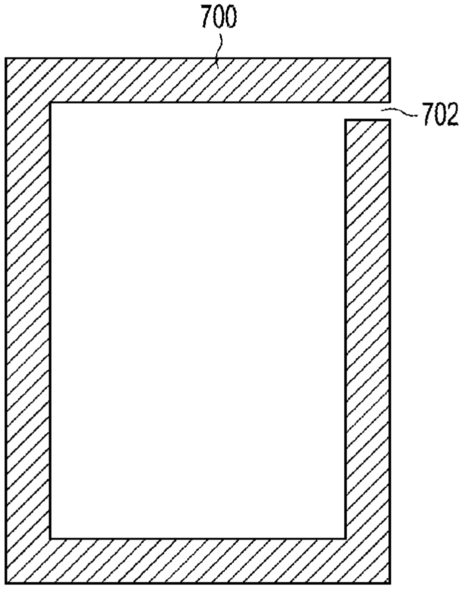
FIG. 7 illustrates a rectangular, frame-shaped radiation structure that includes a non-conductive gap, according to an example embodiment.

FIGS. 6 and 7 illustrate two embodiments of rectangular, frame-shaped radiation structures (or radiation frames) 600, 700. In some embodiments, such as the embodiment illustrated in FIG. 6, the radiation frame 600 is formed from conductive material that is continuous around an entirety of the radiation frame. In other words, the radiation frame 600 is completely closed. In other embodiments, such as the embodiment illustrated in FIG. 7, the radiation frame 700 is non-continuous in that the conductive material forming the radiation frame 700 includes a non-conductive gap 702. According to various embodiments, non-conductive gap 702 may have a width in a range of about 0.5 mm to about 2.0 mm, although the gap 702 may be wider or narrower, in other embodiments.

Figure 8:
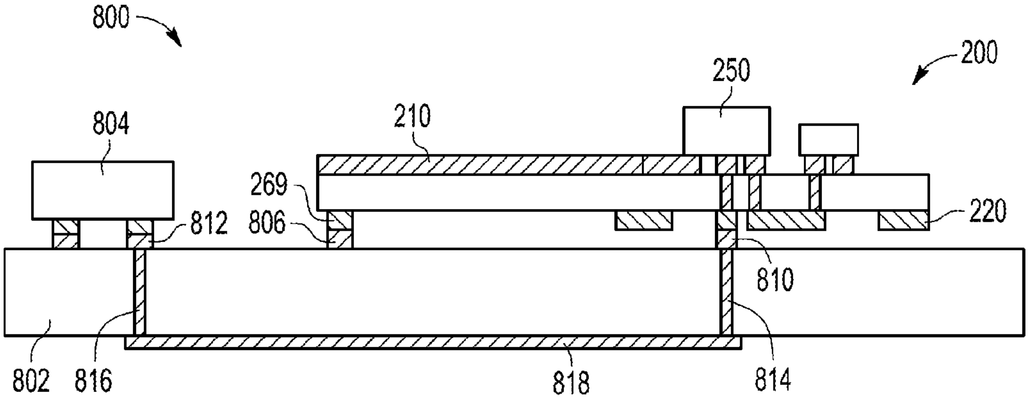
FIG. 8 illustrates a system that includes a non-RF component and an RF module with a PIFA and a frame-shaped radiation structure, according to an example embodiment.

Embodiments of RF modules with radiation frames, such as those described above, may be incorporated into systems in which there is a desire to communicate information wirelessly. For example, FIG. 8 illustrates a system 800 that includes a substrate 802 (e.g., a PCB), a non-RF component 804, and an RF module, such as module 200 (FIG. 2). For convenience, the reference numbers used in FIG. 2 for various elements of RF module 200 are retained in FIG. 8. RF module 200 and non-RF component 804 are mechanically coupled to substrate 802. For example, RF module 200 may be mechanically coupled to substrate 802 using at least one conductive structure 269 (e.g., a floating pad), which may be soldered to at least one corresponding conductive structure 806 (e.g., another floating pad) on substrate 802. Non-RF component 804 may be similarly mechanically coupled to substrate 802. Alternatively, RF module 200 and/or non-RF component 804 may be mechanically coupled to substrate 802 using pins, glues, or other means.

As discussed previously, RF module 200 includes a PIFA 210, a radiation frame 220, and various electrical components (e.g., component 250), which enable PIFA 210 to transmit RF signals over an air interface, receive RF signals from an air interface, or both. According to an embodiment, non-RF component 804 is configured to produce signals for transmission by RF module 200 and/or to consume signals produced by RF module 200 (based on RF signals that RF module 200 received from the air interface). RF module 200 and non-RF component 804 may be electrically coupled to substrate 802 and to each other using various pads (e.g., pads 810, 812), vias (e.g., vias 814, 816), and conductive interconnects (e.g., conductive interconnect 818) on and through substrate 802. In this manner, RF module 200 and non-RF component 804 may exchange electrical signals.

Although a particular system configuration is illustrated in FIG. 8, it is to be understood that the illustrated configuration is provided for example purposes only, and that a number of modifications could be made to system 800 while still enjoying the benefits of the various embodiments. For example, although only a single RF module 200 and non-RF component 804 is illustrated in FIG. 8, other systems may include multiple RF modules 200 and/or non-RF components 804. In addition, although RF module 200 and non-RF component 804 both are shown to be coupled to a top side of substrate 802, either or both the RF module 200 or the non-RF component 804 may be coupled to the bottom side of substrate 802. In addition, although various vias 814, 816 and bottom-side interconnect 818 are illustrated in FIG. 8, RF module 200 and non-RF component 804 also or alternatively may be electrically coupled using top-side interconnects.

Thus, various embodiments of inverted-F antennas, and modules and systems in which they are incorporated have been described above. An embodiment of an antenna includes a radiation frame and a planar inverted-F antenna (PIFA). The radiation frame has a frame shape that defines a central opening. The PIFA includes an antenna arm, a feed arm, and a shorting arm. A distal end of the shorting arm is conductively coupled with the radiation frame.

An embodiment of an RF module includes a substrate and an antenna coupled to the substrate. The antenna includes a radiation frame and a planar inverted-F antenna. The radiation frame has a frame shape that defines a central opening. The radiation frame forms a first portion of a first metal layer of the module. The PIFA includes an antenna arm, a feed arm, and a shorting arm. A distal end of the shorting arm is conductively coupled with the radiation frame.

An embodiment of a system includes a non-RF component that produces a signal for transmission, and an RF module electrically coupled to but physically distinct from the non-RF component. The module is configured to receive the signal, convert the signal to an RF signal, and radiate the RF signal over an air interface. The module includes a substrate and an antenna coupled to the substrate. The antenna includes a radiation frame and a PIFA. The radiation frame has a frame shape that defines a central opening. The radiation frame forms a first portion of a first metal layer of the module. The PIFA includes an antenna arm, a feed arm, and a shorting arm. A distal end of the shorting arm is conductively coupled with the radiation frame.

As used herein, the term "pad" means a conductive connection between circuitry external to a package and circuitry internal to the package. A "pad" should be interpreted to include a pin, a pad, a bump, a ball, and any other conductive connection. The term "interconnect" means an input (I) conductor for a particular IC, an output (O) conductor for a particular IC, or a conductor serving a dual I/O purpose for a particular IC. In some cases, an interconnect may be directly coupled with a package pin, and in other cases, an interconnect may be coupled with an interconnect of another IC.

The terms "first," "second," "third," "fourth" and the like in the description and the claims, if any, may be used for distinguishing between similar elements or steps and not necessarily for describing a particular sequential or chronological order. It is to be understood that the terms so used are interchangeable under appropriate circumstances such that the embodiments described herein are, for example, capable of operation or fabrication in sequences or arrangements other than those illustrated or otherwise described herein. In addition, the sequence of processes, blocks or steps depicted in and described in conjunction with any flowchart is for example purposes only, and it is to be understood that various processes, blocks or steps may be performed in other sequences and/or in parallel, in other embodiments, and/or that certain ones of the processes, blocks or steps may be combined, deleted or broken into multiple processes, blocks or steps, and/or that additional or different processes, blocks or steps may be performed in conjunction with the embodiments. Furthermore, the terms "comprise," "include," "have" and any variations thereof, are intended to cover non-exclusive inclusions, such that a process, method, article, or apparatus that comprises a list of elements or steps is not necessarily limited to those elements or steps, but may include other elements or steps not expressly listed or inherent to such process, method, article, or apparatus.

It is to be understood that various modifications may be made to the above-described embodiments without departing from the scope of the inventive subject matter. While the principles of the inventive subject matter have been described above in connection with specific systems, apparatus, and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. An antenna comprising:

a radiation frame having a frame shape that defines a central opening, wherein the radiation frame is formed from a first portion of a first metal layer;

a planar inverted-F antenna (PIFA) that includes an antenna arm, a feed arm, and a shorting arm, wherein the PIFA is formed from a second metal layer, and wherein a distal end of the shorting arm is conductively coupled with the radiation frame; and a conductive structure formed from a second portion of the first metal layer, wherein the conductive structure is located within the central opening, and wherein the conductive structure comprises routing that provides at least a portion of a conductive path between the PIFA and an electrical component.

2. An antenna comprising:

a radiation frame having a frame shape that defines a central opening;

a planar inverted-F antenna (PIFA) that includes an antenna arm, a feed arm, and a shorting arm, wherein a distal end of the shorting arm is conductively coupled with the radiation frame;

a dielectric substrate suitable for mounting an electrical component, wherein the dielectric substrate has a first surface and an opposed, second surface, the radiation frame is formed on the first surface, the PIFA is formed on the second surface, and a size of the central opening is large enough for the electrical component to be coupled to a portion of the dielectric substrate that coincides with the central opening in the radiation frame; and a conductive structure between the first surface and the second surface, which conductively couples the distal end of the shorting arm with the radiation frame.

3. The antenna of claim 1, wherein the radiation frame has a rectangular frame shape.

4. The antenna of claim 1, wherein the radiation frame has a non-rectangular frame shape.

5. The antenna of claim 1, wherein the radiation frame including the central opening occupies a total area, and wherein a central opening area is in a range of about 20 percent to about 80 percent of the total area.

6. The antenna of claim 1, wherein the radiation frame has a frame width in a range of about 5 percent to about 30 percent of a length of the radiation frame.

7. The antenna of claim 1, wherein the radiation frame is formed from conductive material that is continuous around an entirety of the radiation frame.

8. The antenna of claim 1, wherein the radiation frame is non-continuous in that the radiation frame includes a non-conductive gap.

9. The antenna of claim 1, wherein the radiation frame has a dimension that is less than about one quarter of an operating wavelength ($\lambda/4$).

10. An antenna comprising:

a radiation frame having a frame shape that defines a central opening, wherein the radiation frame is completely closed and is formed from a conductive material that is continuous around an entirety of the radiation frame; and a planar inverted-F antenna (PIFA) that includes an antenna arm, a feed arm, and a shorting arm, wherein a distal end of the shorting arm is conductively coupled with the radiation frame, wherein the radiation frame and the PIFA are formed in a same metal layer.

11. A radio frequency (RF) module comprising:

a substrate;

an antenna coupled to the substrate, and having a radiation frame with a frame shape that defines a central opening, wherein the radiation frame forms a first portion of a first metal layer of the module, and a planar inverted-F antenna that includes an antenna arm, a feed arm, and a shorting arm, wherein the planar inverted-F antenna is formed from a second metal layer, and wherein a distal end of the shorting arm is conductively coupled with the radiation frame; and a conductive structure formed from a second portion of the first metal layer, wherein the conductive structure is located within the central opening, and wherein the conductive structure comprises routing that provides at least a portion of a conductive path between the planar inverted-F antenna and an electrical component.

12. The module of claim 11, further comprising:

a conductive via between the conductive structure and the second metal layer of the module.

13. A radio frequency (RF) module comprising:

a substrate;

an antenna coupled to the substrate, and having a radiation frame with a frame shape that defines a central opening, wherein the radiation frame forms a first portion of a first metal layer of the module, and a planar inverted-F antenna that includes an antenna arm, a feed arm, and a shorting arm, wherein a distal end of the shorting arm is conductively coupled with the radiation frame;

a first conductive structure in the central opening, wherein the first conductive structure forms a second portion of the first metal layer;

a first electrical component coupled to a portion of the substrate that coincides with the central opening; and a second electrical component, and wherein the first conductive structure comprises routing that provides at least a portion of a conductive path between the first electrical component and the second electrical component.

14. The module of claim 13, wherein the first electrical component is coupled to a second conductive structure on a first surface of the substrate, and the substrate includes at least one dielectric layer between the first surface and the first metal layer, wherein the module further comprises:

a conductive via between the first conductive structure and the second conductive structure.

15. The module of claim 13, wherein the first electrical component is selected from a group comprising a transmitter, a receiver, and a transceiver.

16. A system comprising:

a non-RF component that produces a signal for transmission; and an RF module electrically coupled to but physically distinct from the non-RF component, wherein the module is configured to receive the signal, convert the signal to an RF signal, and radiate the RF signal over an air interface, and wherein the module includes a substrate, a conductive structure, and an antenna coupled to the substrate, and wherein the antenna includes a radiation frame with a frame shape that defines a central opening, wherein the radiation frame forms a first portion of a first metal layer of the module, and a planar inverted-F antenna that includes an antenna arm, a feed arm, and a shorting arm, wherein the planar inverted-F antenna is formed from a second metal layer of the module, and wherein a distal end of the shorting arm is conductively coupled with the radiation frame, and wherein the conductive structure is formed from a second portion of the first metal layer, the conductive structure is located within the central opening, and the conductive structure comprises routing that provides at least a portion of a conductive path between the planar inverted-F antenna and an electrical component.

17. The system of claim 16, wherein the non-RF component and the module are coupled to a printed circuit board.

* * * * *